(12) United States Patent
Akavaram et al.

(10) Patent No.: US 12,399,853 B2
(45) Date of Patent: Aug. 26, 2025

(54) MECHANISM TO IMPROVE LINK INITIALIZATION TIME

(71) Applicant: QUALCOMM Incorporated, San Diego, CA (US)

(72) Inventors: Santhosh Reddy Akavaram, Hyderabad (IN); Ravindranath Doddi, Hyderabad (IN); Prakhar Srivastava, Lucknow (IN); Umamaheshwaran V, Salem (IN); Ravi Kumar Sepuri, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 18/540,813

(22) Filed: Dec. 14, 2023

(65) Prior Publication Data
US 2025/0199979 A1 Jun. 19, 2025

(51) Int. Cl.
*G06F 13/40* (2006.01)
*G06N 20/00* (2019.01)

(52) U.S. Cl.
CPC ......... *G06F 13/4004* (2013.01); *G06N 20/00* (2019.01); *G06F 2213/40* (2013.01)

(58) Field of Classification Search
CPC .. G06F 13/4004; G06F 2213/40; G06N 20/00
See application file for complete search history.

(56) References Cited

U.S. PATENT DOCUMENTS

| | | | |
|---|---|---|---|
| 2011/0179212 A1* | 7/2011 | Hartman | G06F 13/3625 710/309 |
| 2016/0342566 A1* | 11/2016 | Lee | G06F 13/4295 |
| 2017/0235701 A1* | 8/2017 | Pethe | G06F 13/4286 710/313 |
| 2022/0222198 A1* | 7/2022 | Lanka | G06F 13/4273 |
| 2022/0334932 A1* | 10/2022 | Das Sharma | G06F 11/1004 |
| 2022/0334995 A1* | 10/2022 | Das Sharma | G06F 13/4221 |
| 2022/0342841 A1* | 10/2022 | Choudhary | G06F 13/4221 |

* cited by examiner

*Primary Examiner* — Henry Tsai
*Assistant Examiner* — Aurangzeb Hassan
(74) *Attorney, Agent, or Firm* — Loza & Loza, LLP

(57) ABSTRACT

A method for managing an interconnection between chiplets includes initiating sideband link training that includes transmitting a training pattern over each of a plurality of link configurations, where each link configuration includes a sideband data line and a sideband clock line. The method further includes suspending the sideband link training before completion of the sideband link training when the training pattern is transmitted over a first sideband link configuration without error, designating a sideband data line and a sideband clock line in the first sideband link configuration as a functional pair, and initiating mainband link training using the functional pair to communicate link state and status information.

14 Claims, 8 Drawing Sheets

MECHANISM TO IMPROVE LINK INITIALIZATION TIME

TECHNICAL FIELD

The present disclosure relates generally to integrated circuit technology and, more particularly to initializing interconnects between chiplets.

BACKGROUND

Mobile communication devices typically include a variety of components such as circuit boards, integrated circuit (IC) devices, application-specific integrated circuit (ASIC) devices and/or System-on-Chip (SoC) devices. The types of components may include processing circuits, user interface components, storage and other peripheral components that communicate over a serial bus. State-of-the-art mobile application devices demand a small form factor, low cost, a tight power budget, and high electrical performance. For example, wearable processing and communication devices require SoCs and other IC devices that offer higher performance with reduced power requirements in smaller form-factors. Mobile package design has evolved to meet these divergent goals for enabling mobile applications that support multimedia enhancements.

Chiplet technology can be used to address some of the performance, power, size and other design requirements. Chiplets are a product of improved semi-conductor processing and logic design and can provide an increase in the quantity of logic circuits that can be included in integrated circuit devices. A processing system can be separated into subsystems that may be implemented as individual chiplets. An SoC can be optimized or customized by assembling a subset of available chiplets. The assembled chiplets may communicate with each other via one or more intra-chip data buses or similar data communication interconnects. A mobile application device may include multiple SoCs that communicate with each other via similar inter-chip interconnects.

Interconnects between chiplets can be implemented using some combination of point-to-point interfaces and multi-drop buses. Interconnect architectures may be based on a variety of technologies, including Peripheral Component Interconnect Express (PCIe), Universal Serial Bus, and others. There is an ongoing need to improve interconnections, calibration and training techniques in chiplet-based SoCs. Ever-increasing bandwidth and data throughput requirements have necessitated the development of more complex interconnect architectures that require calibration and training to ensure link reliability and integrity.

SUMMARY

Certain aspects of the disclosure relate to IC devices that include multiple chiplets and to training techniques that are optimized for speedy initialization of interconnects between chiplets.

In various aspects of the disclosure, a method for managing an interconnection between chiplets includes initiating sideband link training that includes transmitting a training pattern over each of a plurality of link configurations, where each link configuration includes a sideband data line and a sideband clock line. The method further includes suspending the sideband link training before completion of the sideband link training when the training pattern is transmitted over a first sideband link configuration without error, designating a sideband data line and a sideband clock line in the first sideband link configuration as a functional pair, and initiating mainband link training using the functional pair to communicate link state and status information.

In various aspects of the disclosure, a processor-readable storage medium stores code that, when executed by a processor causes a processing circuit to initiate sideband link training that includes transmitting a training pattern over each of a plurality of link configurations, where each link configuration includes a sideband data line and a sideband clock line. The code further causes the processing circuit to suspend the sideband link training before completion of the sideband link training when the training pattern is transmitted over a first sideband link configuration without error, designate a sideband data line and a sideband clock line in the first sideband link configuration as a functional pair, and initiate mainband link training using the functional pair to communicate link state and status information.

In various aspects of the disclosure, a sideband communication system includes a transmitter physical layer circuit coupled to a plurality of sideband data lines and a plurality of sideband clock lines, a transmitter physical layer circuit coupled to the plurality of sideband data lines and the plurality of sideband clock lines, and a controller. The controller is configured to initiate sideband link training that includes transmitting a training pattern over each of a plurality of link configurations. Each link configuration includes a sideband data line and a sideband clock line. The controller is further configured to suspend the sideband link training before completion of the sideband link training when the training pattern is transmitted over a first sideband link configuration without error, designate a sideband data line and a sideband clock line in the first sideband link configuration as a functional pair, and initiate mainband link training using the functional pair to communicate link state and status information.

In certain aspects, sideband link retraining may be initiated when a sideband error is detected. The sideband link retraining may include transmitting the training pattern over the functional pair. The sideband link retraining may be terminated when the training pattern is transmitted over the functional pair without error. The sideband link retraining may be continued using other link configurations in the plurality of link configurations when a sideband link error is detected while transmitting the training pattern over the functional pair. The interconnection may be reset when sideband link errors are detected in all transmissions during the sideband link retraining.

In one aspect, the sideband error is detected in a transmission over the sideband link when the interconnection is in an active state in which the mainband link is configured for exchanging mainband data. The interconnection may be returned to the active state after terminating the sideband link retraining.

In one aspect, the sideband error is detected in a transmission over the sideband link when the interconnection is in a low-power state. The interconnection may be returned to the low-power state after terminating the sideband link retraining.

In one aspect, the sideband error is detected in a transmission over the sideband link when the interconnection is in a mainband initialization state or a mainband training state. The interconnection may be returned to the mainband initialization state or the mainband training state after terminating the sideband link retraining.

In one aspect, the sideband link training is defined by a Universal Chiplet Interconnect Express (UCIe) standard. In one aspect, each link configuration includes one of two sideband data lines and one of two sideband clock lines.

In one aspect, the sideband link training and/or the sideband link retraining is managed or controlled by finite state machines in the chiplets. Each finite state machine may be configured to operate as a link training and status state machines in accordance with UCIe specifications.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Data communication links employed by SoCs and other IC devices to connect processors with modems and other peripherals may be operated in accordance with industry or proprietary standards or protocols associated with certain functions or types of devices. In one example, the peripheral component interconnect express (PCIe) standard is a high-speed interface that enables transmission over a high-speed link at data rates measured in gigabits per second. A high-speed interface operated in accordance with PCIe standards and protocols has multiple standby modes when the link is inactive. In operation, one device acts as a host that can communicate through PCIe links with multiple devices, which may be referred to as endpoints. In a PCIe link, data is transmitted in differential signals over one or more two-line lanes. Lanes may provide duplex, serial point-to-point connections.

Serial data links may be used to interconnect certain electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, or any other similar functioning device.

Figure 1:
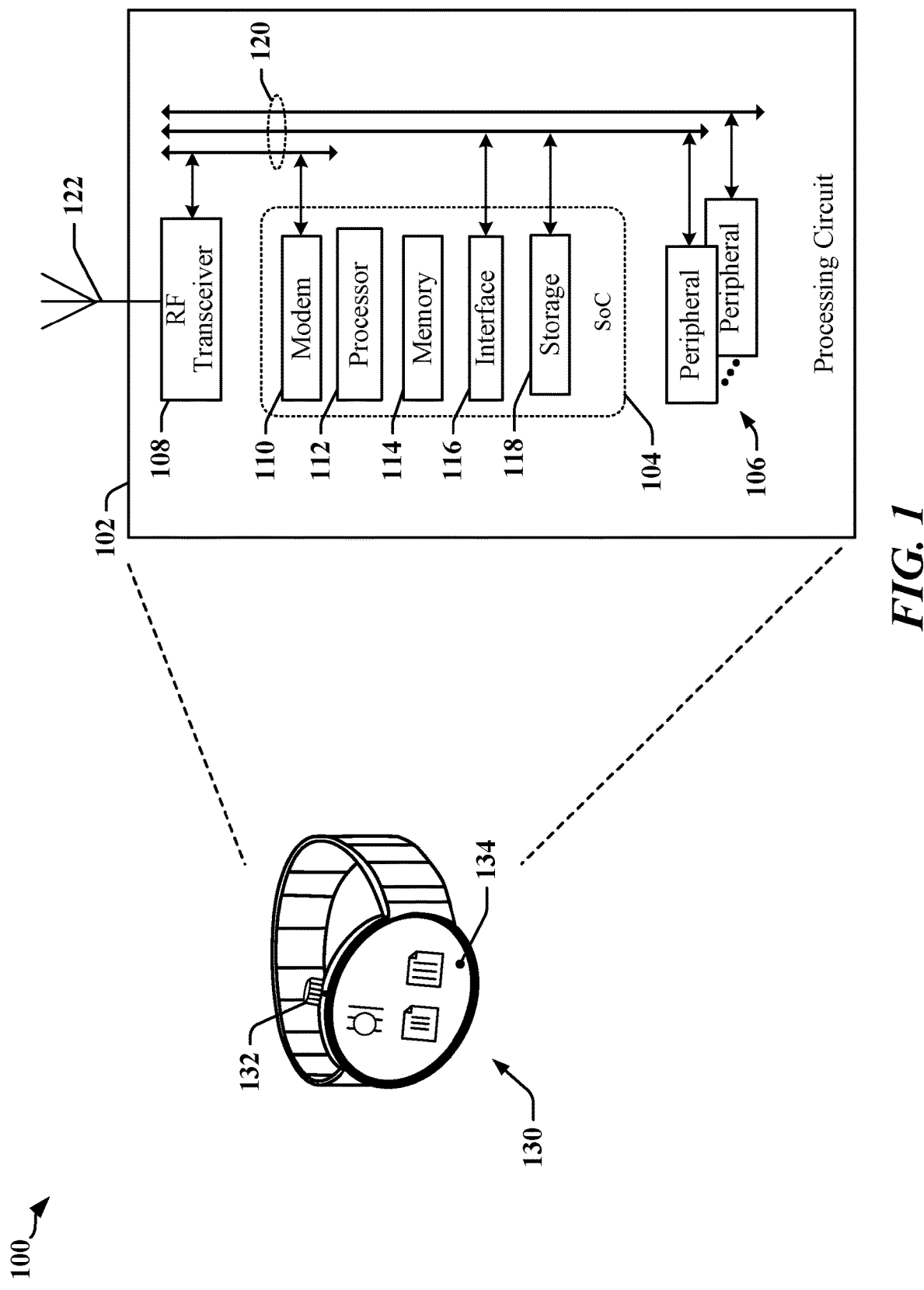
FIG. 1 illustrates an apparatus employing interconnected chiplets.

FIG. 1 illustrates an example of an apparatus 100 that may be implemented using multiple chiplets coupled through one or more data communication buses. The apparatus may be enclosed within a wearable device, such as the illustrated smartwatch 130. A processing circuit 102 of the apparatus 100 includes multiple circuits or devices 104, 106 and/or 108. In various examples, the processing circuit 102 is implemented using one or more ASICs, chiplets, an SoC or other devices arranged in a configuration that can be adapted for use in mobile computing, embedded computing, edge computing. In one example, the apparatus 100 may be configured to support multiple communication technologies, modes or protocols and the processing circuit 102 includes a combination of devices including an SoC 104, one or more peripheral devices 106, and a transceiver 108 that cooperate to enable the apparatus to communicate through an antenna 122 with a radio access network, a core access network, the Internet and/or another network.

The SoC 104 may include one or more processors 112, one or more modems 110, on-board memory 114, a bus interface circuit 116 and/or other logic circuits or functions. The processing circuit 102 may be controlled by an operating system that provides an application programming interface (API) layer that enables the one or more processors 112 to execute software modules residing in the on-board memory 114 or other processor-readable storage 118 provided on the processing circuit 102. The software modules may include instructions and data stored in the on-board memory 114 or processor-readable storage 118. The SoC 104 may access its on-board memory 114, the processor-readable storage 118, and/or storage external to the processing circuit 102. The on-board memory 114, the processor-readable storage 118 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 122, a display 134, operator controls 132, switches or buttons, among other components. A user interface module may be configured to manage the display 134, operator controls 132, etc. and may communicate with other elements of the processing circuit 102 through one or more serial data interconnects.

The processing circuit 102 may provide multiple buses 120 that enable communication between two or more devices 104, 106, and/or 108. In one example, the SoC 104 may include bus interface circuits 116 coupled to one or more of the buses 120. Each of the bus interface circuits 116 may include a combination of circuits, counters, timers, control logic and other configurable circuits or modules. In one example, certain bus interface circuits 116 may be configured to operate in accordance with standards-defined communication specifications or protocols. The processing circuit 102 may include or control a power management function that configures and manages the operation of the apparatus 100.

The illustrated smartwatch 130, other portable or wearable processing and/or communication devices (referred to collectively as portable communication devices or PCDs), sensors, instruments, appliances and other such devices include one or more ICs. These devices may include mobile phones, tablet computers, palmtop computers, portable digital assistants (PDAs), portable game consoles, and other portable electronic devices. PCDs commonly contain integrated circuits or SoCs that include numerous components or subsystems designed to work together to deliver functionality to a user. The various SoC subsystems may communicate with each other via one or more intra-chip data buses or similar data communication interconnects. PCDs may have multiple SoCs that communicate with each other via similar inter-chip interconnects. The ICs are typically packaged in an IC package, which may be referred to as a "semiconductor package" or "chip package." The IC package typically includes a package substrate and one or more IC chips or other electronic modules mounted to the package substrate to provide electrical connectivity to the IC chips. For example, an IC chip in an IC package may be configured as an SoC. The IC chips are electrically coupled to other IC chips and/or to other components in the IC package through electrical coupling to metal lines in the package substrate. The IC chips can also be electrically coupled to other circuits outside the IC package through electrical connections of external metal interconnects (e.g., solder bumps) of the IC package.

Process technology employed to manufacture semiconductor devices, including IC devices is continually improving. Process technology includes the manufacturing methods used to make IC devices and defines transistor size, operating voltages and switching speeds. Features that are constituent elements of circuits in an IC device may be referred as technology nodes and/or process nodes. The terms technology node, process node, process technology may be used to characterize a specific semiconductor manufacturing process and corresponding design rules. Faster and more power-efficient technology nodes are being continuously developed through the use of smaller feature size to produce smaller transistors that enable the manufacture of higher-density ICs. Design rules for newer process technology that use low-voltage transistors may preclude the use of higher voltage transistors supported by previous process technology generations. The unavailability of certain higher-voltage transistors may present an impediment to circuit designers for IC devices that include multiple voltage domains.

The increasing complexity and functionality required from semiconductor devices tends to increase the physical dimensions of integrated circuit devices in which they are embodied. An upper limit on integrated circuit device is the maximum "reticle" size that in some instances refers to the size of the photomask used to manufacture the integrated circuit devices. Chiplets provide one approach to avoiding the maximum reticle size. Moreover, chiplet technology can be used to address some of the performance, power and size design requirements for complex SoCs, including SoCs used in certain mobile or wearable devices. The use of smaller dies can improve manufacturing yields.

Figure 2:
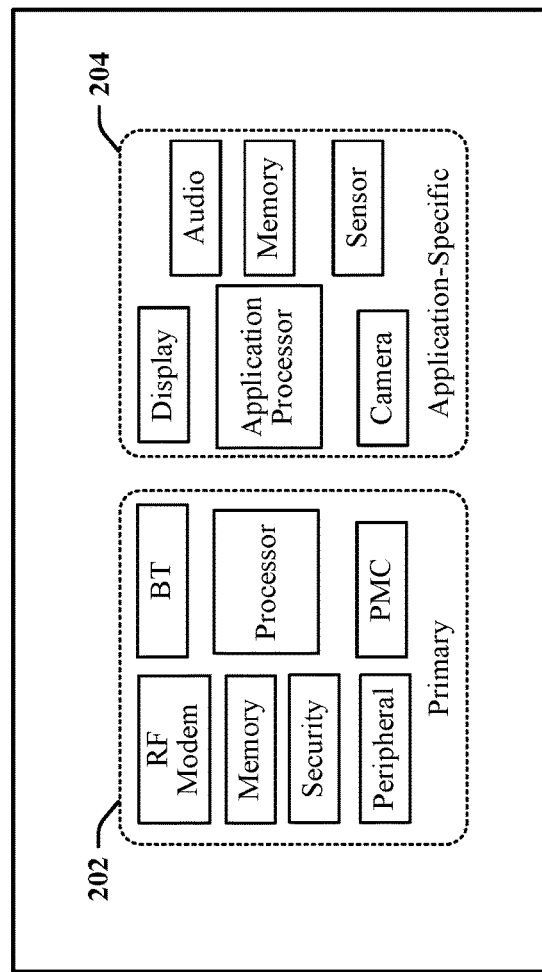
FIG. 2 illustrates certain aspects of an SoC constructed from chiplets.

The block diagram in FIG. 2 illustrates certain aspects of an SoC 200 that can be constructed using chiplets. The SoC 200 may be configured by selecting a combination of chiplets that implement certain subsystems or distinct functional elements. In the illustrated example, the SoC 200 includes a set of primary chiplets 202 that enable the SoC 200 to perform core processing, security and communication functions. The set of primary chiplets 202 include a processor, memory and one or more modems. The illustrated SoC 200 also includes a set of application-specific chiplets 204 that includes an application processor, display driver, camera interface and audio controller. In a remote sensing device or appliance, the audio-visual components could be omitted and may be replaced with analog-to-digital controllers, for example.

The SoC 200 may include a variety of processing engines, such as central processing units (CPUs) with multiple cores, graphical processing units (GPUs), digital signal processors (DSPs), neural processing units (NPUs), wireless transceiver units (also referred to as modems), peripherals, display and imaging interfaces, etc. Each of these subsystems and other functional elements can be implemented as an individual chiplet, or as a combination of chiplets. The chiplets included in the SoC 200 can be proprietary or may be acquired from a variety of sources. An SoC may be constructed from chiplets manufactured at different process nodes and/or operated at different voltages.

Figure 3:
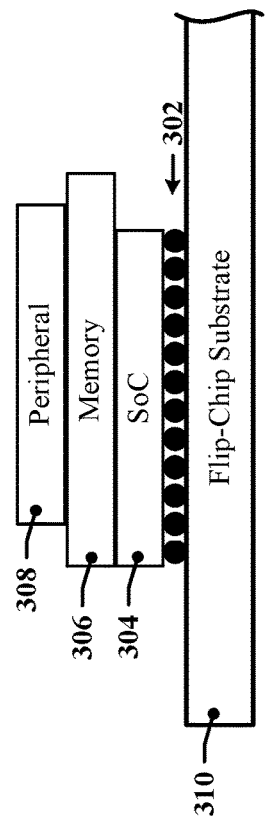
FIG. 3 illustrates an example of an SoC in which chiplets are stacked vertically on a substrate.

FIG. 3 illustrates an example of an SoC 300 in which certain chiplets 304, 306, 308 are stacked vertically on a substrate 310. Some chiplets can be included in stacks that are deployed across the surface of the substrate 310, while other chiplets may be individually mounted on the surface of the substrate. Chiplets may be mounted on the surface of the substrate using solder balls 302 that provide electrical and/or thermal coupling between substrate and the mounted chiplets. An interconnect structure may be formed that enables chiplets 304, 306, 308 in a stack of chiplets to communicate with one another, with other chiplets mounted on the substrate 310 and with input/output structures that connect the SoC 200 with other circuits, displays, imaging sensors and other peripherals with an apparatus.

The use of chiplets can reduce the areal size of the substrate 310 and increase three-dimensional packing density. The constituent chiplets may provide complex features and high performance within a smaller form-factor operated at lower power specifications. Moreover, each chiplet may define multiple power domains, operate at different frequencies and different chiplets may manage power/frequency modes independently and. In some instances, two or more chiplets may be operated in mutually exclusive power states. Additionally, operating conditions for an SoC depend on the type, number and arrangement of chiplets included on the substrate in addition to the modes of operation defined by applications. It is necessary to consider power usage by all chiplets in the SoC in order to ensure compliance with power budgets assigned for an application or device.

Conventional chiplet-based implementations suffer from limitations that include complex or difficult interconnect routing, local hotspots arising from routing congestion caused by connection architecture and challenges to signal timing specifications. In certain examples, local hotspots can arise from routing congestion, increased feature complexity and circuit concentrations. In certain examples, signal timing specifications can be compromised due to the necessity for an increased number of isolation clamps due to logic placement, number of voltage domains and reduced floorplan. Long wire crossings between chiplets can cause routing congestion and lossy interconnects.

Each chiplet in an SoC may be included to perform a specific function or type of function and the configuration of the chiplets can introduce further complexities and challenges for designers. For example, one chiplet may include radio frequency front end circuits that produce high frequency signals ranging up to 5 GHz or more, and may further include interfaces that are used by low-frequency power management circuits. A designer may import previously defined circuit blocks to implement some of the internal functions. These circuit blocks may be referred to as macros. Imported circuit blocks for a given process technology may be described, characterized or defined by a set of masks, hardware description language, specifications and test data. Commercially available or proprietary circuit blocks may be referred to as hard macros. Hard macros are tested and verified for a set of design and operating specifications. It is common for hard macros and other circuit blocks to define multiple power domains.

The Universal Chiplet Interconnect Express (UCIe) is an example of a standardized chiplet interconnect specification. The UCIe specification enables construction of large System-on-Chip (SoC) packages that in aggregate can exceed the maximum reticle size. The adoption of the UCIe specification has facilitated the integration of chiplets manufactured by different vendors into a single package. The UCIe specification enables the integration of chiplets fabricated using different silicon manufacturing processes into a single package, as required or desired for a specific device type, computing performance and/or to better meet power consumption budgets. The UCIe specification defines physical layer circuits and interconnects, protocol stacks and defines a software architecture and procedures to be used for compliance testing.

The UCIe specification defines different packaging options. One packaging option is the standard packaging option, which may also be referred to as the two-dimensional (2D) option. The standard packaging option may be applied to technology that can be used for low-cost devices and long-reach channels, where distances of between 10 mm and 25 mm may be considered to be long-reach. Another packaging option is the advanced packaging option, which may also be referred to as the 2.5D option. The advanced packaging option may be applied to technology that can be used for performance-optimized applications with short channel lengths. For example, channels that have a length that is less than 2 mm may be considered to be a short channel.

Figure 4:
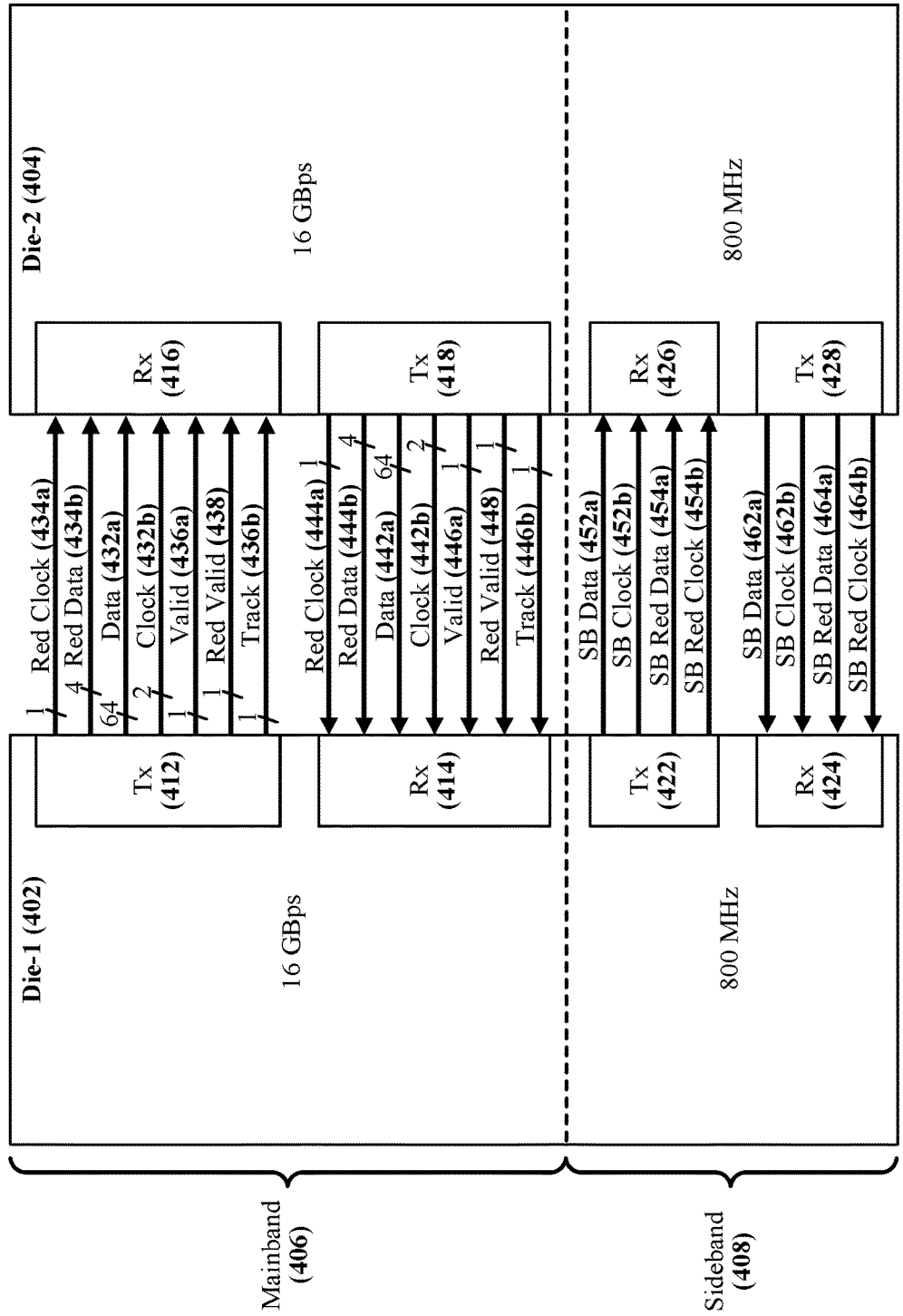
FIG. 4 illustrates an example of advanced packaging option implemented between a first die and a second die.

FIG. 4 illustrates an example of advanced packaging option link module 400 implemented between a first die 402 and a second die 404. The link module 400 provides an interface that supports separate high-speed communication and low-speed communication interfaces. A main communication link (the mainband link 406) provides the primary communication path and is used to exchange application data and messages. A secondary communication link (the sideband link 408) provides a communication path for control data, including link state and status messages, power management messages, error handling handshake messages, and messages related to transition negotiation regarding operational state of the first die 402 and a second die 404.

In the illustrated example, the mainband transmitter physical layer (PHY) circuit 412 in the first die 402 is coupled to a mainband data bus 432a over which up to 64-bit parallel data can be transmitted according to timing provided by one or more of two mainband clock signals transmitted over mainband clock lines 432b. The mainband data bus 432a and mainband clock lines 432b are driven by the mainband transmitter PHY circuit 412. The mainband transmitter PHY circuit 412 in the first die 402 may transmit a framing signal over a mainband valid line 436a to indicate framing information associated with transmitted data and a track signal over a track line 436b to enable the receiver to correct or adjust phase in received versions of the two mainband clock signals. The mainband transmitter PHY circuit 412 is coupled to six redundant pins of the first die 402. The redundant pins may be used to replace data or clock lines that do not function according to specification due to manufacturing process variances or low-quality results from a packaging process. The redundant pins can reduce yield loss.

The UCIe specification defines test and repair procedures that are based on the available redundant pins. One redundant pin is allocated for use as a redundant mainband clock line 434a, four redundant pins are allocated for transmission data over redundant mainband data lines 434b and one redundant pin is allocated for a redundant valid line 438.

The mainband receiver PHY circuit 416 in the second die 404 is coupled to the mainband data bus 432a over which it can receive up to 64-bit parallel data according to timing provided by one or more of two mainband clock signals received over the mainband clock lines 432b. The mainband clock signals are provided by the mainband transmitter PHY circuit 412 in the first die 402. The mainband receiver PHY circuit 416 in the second die 404 may receive a mainband valid signal over a mainband valid line 436a to indicate framing information associated with transmitted data and a track signal from the track line 436b to enable correction or adjustment of phase in the two mainband clock signals. The mainband receiver PHY circuit 416 is further coupled to six redundant pins of the second die 404. One redundant pin may be allocated as the redundant mainband clock line 434a, four redundant pins are allocated as the redundant mainband data lines 434b and one redundant pin is allocated as a redundant valid line 438.

The mainband transmitter PHY circuit 418 in the second die 404 is coupled to a primary mainband data bus 442a over which it can transmit up to 64-bit parallel data according to timing provided by one or more of two clock signals transmitted over clock lines 442b by the mainband transmitter PHY circuit 418. The mainband transmitter PHY circuit 418 in the second die 404 may transmit a mainband valid signal over the mainband valid line 446a to indicate framing information associated with transmitted data and a track signal over the track line 446b to enable the receiver to correct or adjust phase in received versions of the two clock signals transmitted over the clock lines 442b. The mainband transmitter PHY circuit 412 is coupled to a further six redundant pins of the second die 404. These redundant pins may be used to replace data or clock lines that do not function according to specification due to manufacturing process variances or low-quality results from a packaging process. The redundant pins can reduce yield loss. One redundant pin is allocated for use as a redundant mainband clock line 444a, four redundant pins are allocated for transmission of redundant mainband data lines 444b and one redundant pin is allocated for use as a redundant valid line 448.

The mainband receiver PHY circuit 414 in the first die 402 is coupled to the primary mainband data bus 442a over which it can receive up to 64-bit parallel data according to timing provided by one or more of the two mainband clock signals received over the mainband clock lines 432b from the mainband transmitter PHY circuit 418 in the second die 404. The mainband receiver PHY circuit 414 in the first die 402 may receive a mainband valid signal over the mainband valid line 446a that indicates framing information associated with transmitted data and a track signal over the track line 446b to enable correction or adjustment of phase in the two mainband clock signals received over the mainband clock lines 432b. The mainband receiver PHY circuit 414 is further coupled to a further six redundant pins of the first die 402. One redundant pin may be allocated for receiving the redundant mainband clock line 444a, four redundant pins are allocated for receiving the redundant mainband data lines 444b and one redundant pin is allocated for receiving a framing signal over the redundant valid line 448.

In the illustrated example, the sideband transmitter PHY circuit 422 in the first die 402 is coupled to a sideband data line 452a over which it can transmit data according to timing provided by a sideband clock signal that is transmitted over a sideband clock line 452b by the sideband transmitter PHY circuit 422. The sideband transmitter PHY circuit 422 in the first die 402 may be configured to transmit over a redundant sideband data line 454a and a redundant sideband clock line 454b. The sideband receiver PHY circuit 426 in the second die 404 is coupled to the sideband data line 452a over which it can receive data according to timing in the sideband clock signal transmitted over the sideband clock line 452b by the sideband transmitter PHY circuit 422 in the first die 402. The sideband receiver PHY circuit 426 in the second die 404 may be configured to receive signals over the redundant sideband data line 454a and the redundant sideband clock line 454b. The sideband transmitter PHY circuit 428 in the second die 404 is coupled to a sideband data line 462a over which it can transmit data according to timing provided by a sideband clock signal transmitted over the sideband clock line 462b. The sideband transmitter PHY circuit 428 in the second die 404 may transmit a redundant sideband data signal over a redundant sideband data line 464a and a redundant sideband clock signal over a redundant sideband clock line 464b. The sideband receiver PHY circuit 424 in the first die 402 is coupled to the sideband data line 462a over which it can receive data according to timing in the sideband clock signal received over the sideband clock line 462b and provided by the sideband transmitter PHY circuit 428 in the second die 404. The sideband receiver PHY circuit 424 in the first die 402 may receive redundant sideband data over a redundant sideband data line 464a and the redundant sideband clock signal over the redundant sideband clock line 464b.

Figure 5:
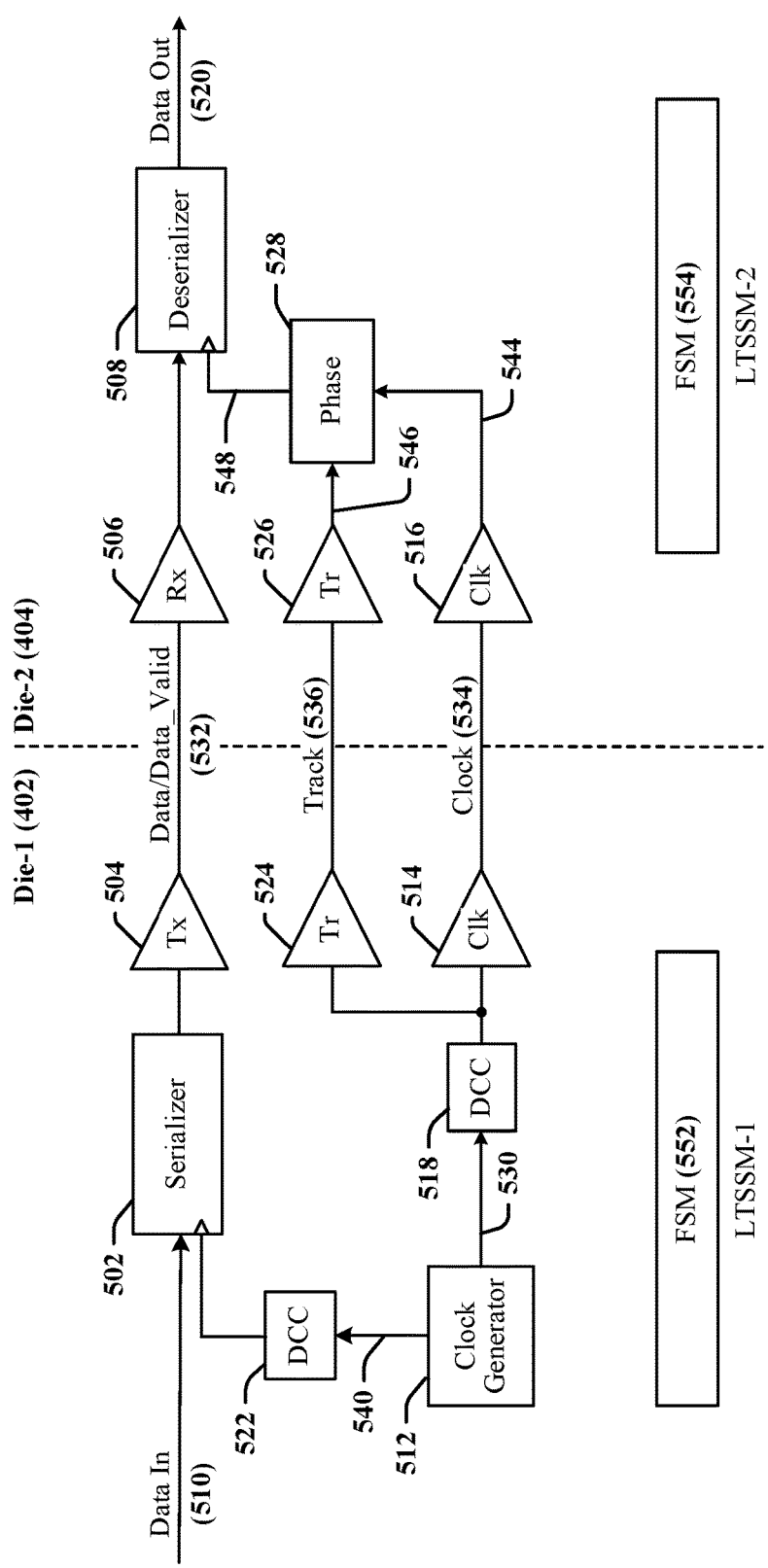
FIG. 5 illustrates and example of data transmission through an advanced packaging option interface configured to operate in accordance with Universal Chiplet Interconnect Express (UCIe) specifications.

FIG. 5 illustrates and example of data transmission through an advanced packaging option interface 500 configured to operate in accordance with UCIe specifications. Certain elements of the circuits illustrated in FIG. 5 are abstracted or summarized. For example, FIG. 5 depicts one data or data valid lane 532 that couples the first die 402 and the second die 404. Multiple data or data valid lanes are typically used. The first die 402 includes a serializer 502 that is configured to receive parallel input data 510. The data stream produced by the serializer 502 is provided to a data line driving circuit 504 that transmits the datastream over the data or data valid lane 532. A data receiving circuit 506 coupled to the data or data valid lane 532 cooperates with a deserializer 508 to sample or capture bits in the received bitstream and provide parallel output data 520.

A clock generator 512 generates one or more clock signals that can be used to serialize the parallel input data 510 and to control data transmission over the data or data valid lane 532. The clock generator 512 provides a first clock signal 530 that is used to control timing of the serializer 502. In certain implementations, data is encoded in a double data rate signal in which each two bits of data are transmitted for each cycle of a transmitted clock signal. For example, the data or data valid lane 532 may be configured for a 16 gigabits per second (Gbps) data rate when the first clock signal 530 has a frequency of 8 GHz. The first clock signal 530 may be coupled to the serializer 502 through a duty cycle correction circuit 522 to ensure that the durations of both half-cycles of the first clock signal 530 are closely matched. The clock generator 512 may provide a second clock signal 540 to a clock line driving circuit 514 that drives the clock lane 534. The second clock signal 540 may be coupled to the clock line driving circuit 514 through a duty cycle correction circuit 518. The output of the duty cycle correction circuit 518 may be provided to a tracking line driving circuit 524, which transmits a version of the clock signal over the track lane 536.

At the receiver, a clock receiving circuit 516 coupled to the clock lane 534 and a track receiving circuit 526 coupled to the track lane 536 provide versions 544, 546 of the second clock signal 540 to a phase correction or alignment circuit 528 that produces a clock signal 548 that us used to clock the deserializer 508.

The example illustrated in FIG. 5 relates to mainband communication in which a framing signal (i.e. a data valid signal) is transmitted over a data or data valid lane 532 and a tracking signal is transmitted over a track lane 536. The circuits and structures illustrated in FIG. 5 correspond in some respects to the sideband communication used to exchange command and control information. Furthermore, the example illustrated in FIG. 5 shows communication from the first die 402 to the second die 404. Similar circuits and structures may be configured to enable mainband or sideband communication from the second die 404 to the first die 402.

An initialization procedure provided by the UCIe specification enables the first die 402 and the second die 404 to establish reliable connections. The initialization procedure defines states that correspond to different phases of link initialization. The participants in the initialization procedure are required to progress through a sequence of states before the link can be declared to be active. The initialization procedure may be managed or controlled in each die by a finite state machine (FSM) or by another controller or processor. In the illustrated example, the FSM 552 in the first die 402 and the FSM 554 in the second die 404 may be configured to operate as link training and status state machines (LTSSMs) in accordance with UCIe specifications.

Figure 6:
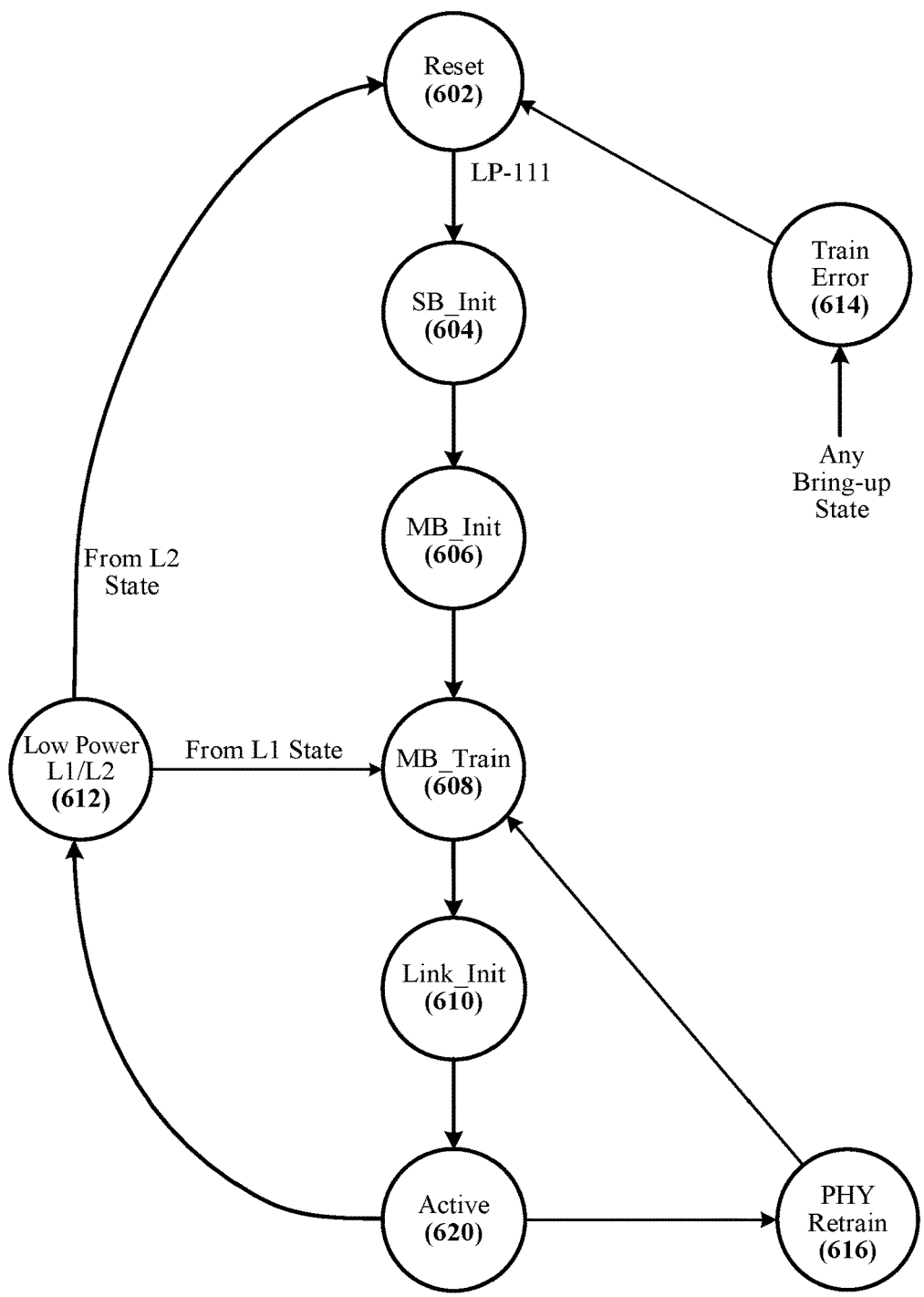
FIG. 6 illustrates an initialization procedure defined by UCIe specifications.

FIG. 6 is a state diagram 600 that illustrates an initialization procedure defined by UCIe specifications. The initialization procedure may be managed or controlled using a processor, microcontroller or an FSM 552, 554 configured to implement an LTSSM in accordance with UCIe specifications. The LTSSM may be initially in a reset state 602 before entering the sideband initialization state 604. The sideband initialization state 604 is used to establish reliable control and command communications over the lower-frequency sideband link. The participants in the initialization procedure are required to test all combinations of lines that include a data line and a clock line. In one example, the combinations tested include: the sideband data line 452a and the sideband clock line 452b; the redundant sideband data line 454a and the redundant sideband clock line 454b; the sideband data line 452a and the redundant sideband clock line 454b; and the redundant sideband data line 454a and sideband clock line 452b. If, during testing, data transmission is unsuccessful using the sideband data line 452a and sideband clock line 452b, then the link may be established using another combination of clock and data lines.

Sideband initialization testing may include transmission and detection of one or more training patterns. In one example, a training pattern may include a transmission of data in 64 data bit transmission intervals and driving data lines low for 32 data bit transmission intervals. Data bit transmission intervals may correspond to one clock cycle and may be referred to as unit intervals (UIs). The duration of a UI defines the minimum time between transitions in signaling state of a data signal. The training patterns are conventionally transmitted over all combinations of the redundant lines. For example, the sideband transmitter PHY circuit 422 transmits the training pattern over all possible clock-plus-data combinations of the sideband data line 452a, sideband clock line 452b, the redundant sideband data line 454a and the redundant sideband clock line 454b.

When the sideband link has been initiated and is functional, the initialization procedure proceeds to a mainband initialization state 606. In certain implementations, the participants in the initialization procedure may test the combination of the mainband data bus 432a, the mainband valid line 436a, the track line 436b and one or more of the mainband clock lines 432b. If data transmission is unsuccessful using the mainband data bus 432a, the mainband valid line 436a, the track line 436b and the mainband clock lines 432b, then the link may be established using the redundant mainband clock line 434a, one or more of the redundant mainband data lines 434b, and/or the redundant valid line 438. The participants in the initialization procedure may test the combination of the primary mainband data bus 442a, mainband valid line 446a, track line 446b and primary mainband clock lines 442b. If data transmission is unsuccessful using the primary mainband data bus 442a, mainband valid line 446a, track line 446b and mainband clock lines 442b, then the link may be established using the redundant mainband clock line 444a, one or more of the redundant mainband data lines 444b, and/or the redundant valid line 448.

When the mainband link has been tested and repaired where necessary, the initialization procedure proceeds to a mainband training state 608. The mainband training state 608 is used to configure and calibrate the PHY circuits 412, 414, 416, 418. Calibration may include calibrating the clock generator 512, the duty cycle control circuits 518, 522, line driving circuits 504, 514, 524, receiving circuits 506, 516, 526 and phase correction or alignment circuit 528. In one example, the clock generator 512 may be calibrated to tune the frequency of the clock signals 530, 540. In another example, the duty cycle control circuits 518, 522 may be calibrated to optimize timing of the clock signals provided to the serializer 502 and line driving circuits 514, 524. In another example, equalizers in the line driving circuits 504, 514, 524 and receiving circuits 506, 516, 526 may be calibrated to accommodate or compensate for transmission errors.

A failure to successfully complete initialization or training in any of the bring-up states 604, 606, 608, 610 causes the participants in the initialization procedure to enter a training error state 614 which ultimately results in reentry to the reset state 602.

When the mainband link has been trained, then the link may be initialized in the link initialization state 610. In one example, link initialization includes establishing initial communication state, clearing buffers and initializing protocol stacks. When the link is initialized, the active state 620 is entered. In some instances, the communication link may be idled and/or caused to enter a low-power state 612. The low-power state 612 may support multiple levels of low-power operation. For example, an L1 power-down mode may maintain certain subcircuits in the PHY circuits 412, 414, 416, 418 in an active, reduced voltage state, while an L2 power-down mode may power down subcircuits in the PHY circuits 412, 414, 416, 418 that are required to maintain calibration of the link. The low-power state 612 is typically entered from the active state 620. Exit from the L1 power-down mode may cause a transition to the mainband training state 608 in order to reconfigure or recalibrate the PHY circuits 412, 414, 416, 418. Exit from the L2 power-down mode may cause a transition to the reset state 602.

Either device coupled to the communication link may cause entry to a PHY retraining state 616. The PHY retraining state 616 may be entered when an error is detected in data transmissions over the mainband data bus 432a. The initialization procedure may be re-entered through the mainband training state 608 in order to reconfigure or recalibrate the PHY circuits 412, 414, 416, 418.

Certain aspects of this disclosure can decrease latencies associated with initial link training and latencies associated with training error handshaking and sideband link retraining after a fatal or non-fatal error event is detected in the sideband link. An LTSSM configured in accordance with certain aspects of this disclosure can improve the efficiency of mainband link communications and maximize throughput while optimizing power consumption following detection of a fatal or non-fatal error event in the sideband link. Certain aspects of this disclosure provide an initialization procedure that is based on and compatible with UCIe specifications and that can accelerate system startup and PHY retraining.

Conventional UCIe initialization procedures require testing of all combinations of the sideband data line 452a, sideband clock line 452b, the redundant sideband data line 454a and the redundant sideband clock line 454b by transmitting and detecting a prolonged training pattern for each combination. The PHY circuit 426 samples and validates a training pattern received over the first sideband data line 452a using the clock signal received over the first sideband clock line 452b and also samples and validates a training pattern received by the first sideband data line 452a using the clock signal received over the second sideband clock line 454b. Additionally, the PHY circuit 426 samples and validates a training pattern received by the second sideband data line 454a using the clock signal received over the first sideband clock line 452b and also samples and validates a training pattern received by the second sideband data line 454a using the clock signal received over the second sideband clock line 454b. The PHY circuit 424 samples and validates a training pattern received by the third sideband data line 462a using the clock signal received over the third sideband clock line 462b and also samples and validates a training pattern received by the third sideband data line 462a using the clock signal received over the fourth sideband clock line 464b. Additionally, the PHY circuit 424 samples and validates a training pattern received by the fourth sideband data line 464a using the clock signal received over the third sideband clock line 462b and also samples and validates a training pattern received by the fourth sideband data line 464a using the clock signal received over the fourth sideband clock line 464b. It will be appreciated that a minimum of 8 training patterns are required to test all combinations of clock and data lines for both directions of transmission in the sideband link.

An initialization procedure provided in accordance with certain aspects of this disclosure enables entry to a mainband initialization state and thence to a mainband training state as soon as a viable combination of sideband clock and data lines has been detected. For example, when the success of the first-tested combination indicates that the sideband data line 452a and sideband clock line 452b provide a viable combination, the LTSSM may cause the interconnect to enter a mainband initialization state and/or a mainband training state before all combinations of the sideband data line 452a, sideband clock line 452b, the redundant sideband data line 454a and the redundant sideband clock line 454b have been tested.

A retraining procedure provided in accordance with certain aspects of this disclosure enables direct entry into the sideband initialization state from any state defined for the LTSSM when an error is detected in the sideband communication interface. The mainband communication link may continue to operate in the active state while sideband retraining is performed. In some instances, exit from the sideband initialization state to the preceding active state, for example, may occur after successful retraining of the sideband link. In the advanced packaging option defined by UCIe specifications, a conventionally configured LTSSM enters the training error state 614 when a fatal or non-fatal error event is detected in the sideband link. A receiving PHY circuit 424, 426 that detects the error event may cause the receiving corresponding transmitting PHY circuit 422, 428 to transmit a request to enter the training error state 614. The requestor enters the training error state 614 upon receipt of a response or after an 8 ms timeout. The LTSSM ultimately transitions to the reset state 602 from the training error state 614 and executes complete link reinitialization and training of both sideband and mainband links. The potential loss of 8 ms due to training error handshaking and the time required for link reinitialization and training time can severely disrupt ongoing data transfers on the mainband link, cause significant drops in link throughput and increase power consumption during link reinitialization.

An LTSSM configured in accordance with certain aspects of this disclosure can improve the efficiency of mainband link communications and maximize throughput while optimizing power consumption following detection of a fatal or non-fatal error event in the sideband link.

Figure 7:
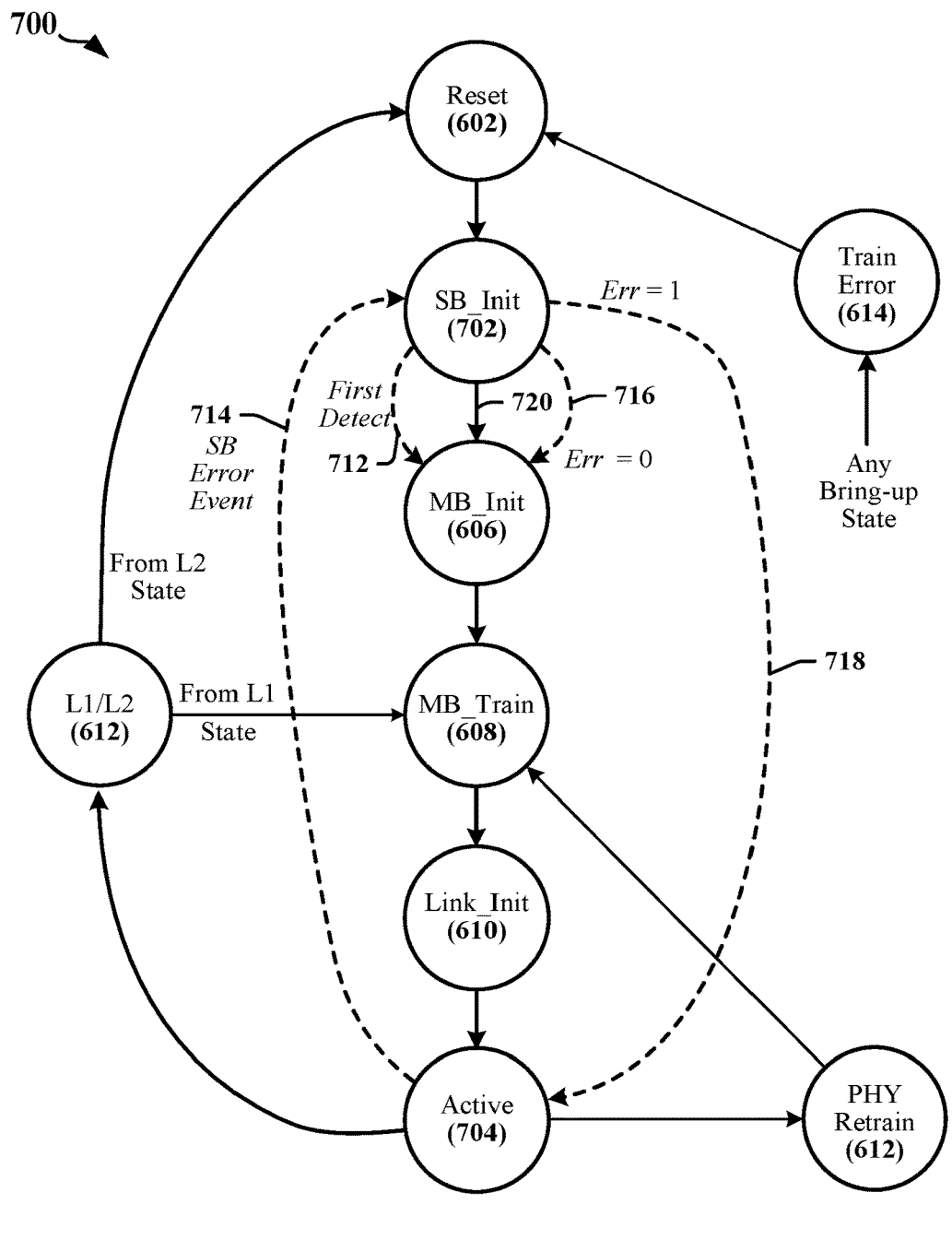
FIG. 7 illustrates an initialization procedure that has been configured in accordance with certain aspects of this disclosure.
Figure 7:
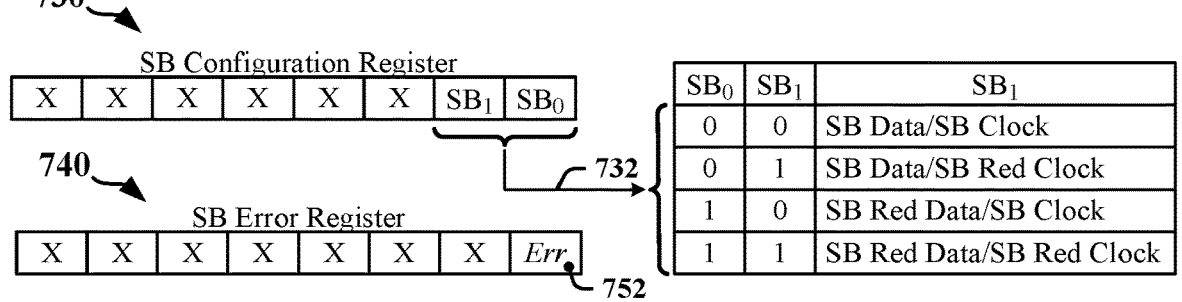

FIG. 7 is a state diagram 700 that illustrates an initialization procedure that has been configured in accordance with certain aspects of this disclosure. The initialization procedure may be managed or controlled using a processor, microcontroller or an FSM 552, 554 configured to operate as an LTSSM that is compatible or consistent with UCIe specifications. The state diagram 700 corresponds in many respects to the state diagram and to the initialization procedures illustrated in FIG. 6, with the exceptions that additional state transitions are provided to and from the sideband initialization state 702 and the active state 704.

The LTSSM may initially be in the reset state 602 before entering the sideband initialization state 702. The sideband initialization state 702 is used to establish reliable control and command communications over the lower-frequency sideband link. UCIe specifications require that participants in the initialization procedure test all combinations of lines that include a data line and a clock line, as described in relation to FIG. 6. In one aspect of this disclosure, a viable combination of sideband clock and data lines detected during testing may cause the LTSSM to initiate an early transition 712 to the mainband initialization state 606. For example, the first-tested combination may produce a successful result indicating that the sideband data line 452a and sideband clock line 452b provide a viable sideband link combination. In this example, mainband initialization state and mainband training can proceed before all combinations of the sideband data line 452a, sideband clock line 452b, the redundant sideband data line 454a and the redundant sideband clock line 454b have been tested. In some implementations, testing of other combinations of sideband data and clock lines can be suspended, terminated, skipped or deferred.

The LTSSM may be configured to maintain, record or store information 732 identifying the combination of a data line and a clock line that are the preferred combination to be used for sideband communication. The preferred combination may be referred to as the "functional pair" and the combination may be identified in a configuration register 730 associated with the transmitter PHY circuit 422, 428 or receiver PHY circuit 424, 426. In the example illustrated in FIG. 7, the information 732 identifying the functional pair may be stored as two-bit binary number in the configuration register 730.

In one aspect of this disclosure, the functional pair identified in the configuration register 730 may be used to prioritize retraining of the sideband link. In one example, entry to the sideband initialization state 702 may be made from the active state 704 when an error is detected in a sideband transmission. The subsequent link training sequence may begin using the functional pair. Since it can be expected that the functional pair since can be successfully retrained, exit from the sideband initialization state 702 can be expedited.

The state diagram 700 in FIG. 7 also illustrates an example a selective retraining for advanced packaging option operation in accordance with certain aspects of this disclosure. The illustrated example relates to direct entry into the sideband initialization state 702 by a transition 714 from the active state 704, with a potential return to the active state 704 via exit transition 718 after a successful retraining of the sideband link. The transition 714 from the active state 704 may be triggered by detection of a fatal or non-fatal error event in the sideband link. Direct entry into the sideband initialization state 702 can preserve certain state and configuration information and may allow mainband communication to continue with minimal or no interruption. The conventional response to detection of the sideband error event in the sideband link typically results in entry to the reset state 602, which can cause initialization of link state and status information. In one example, direct entry into the sideband initialization state 702 may be desired when a functional pair is identified in the configuration register 730. The availability of an identified functional pair can expedite sideband training. In the latter example, the training pattern can be first transmitted over the functional pair with a high probability of a successful result.

Exit from the sideband initialization state 702 may be effected through one of several transitions 712, 716, 720. In some implementations, the LTSSM may update state information after a sideband error event has been detected to indicate the prior state (e.g., the active state 704) and to indicate whether a return to the prior state is desired after sideband link retraining. In one example, a sideband error register 740 may include a bit (Err 752) that is set to '1' when a timeout occurs during error handling handshake. The timeout may occur when a sideband partner does not respond to an error handling message. In one example, UCIe specifications define an 8 ms window for responding to the error handling message. The LTSSM may determine the exit transition 716 or 718 based on the state of Err 752, which indicates whether entry to the sideband initialization state 702 was the result of a sideband error event. If Err 752 is set to binary '1', then exit from the sideband initialization state 702 is through the exit transition 718 to the active state 704. If Err 752 is set to binary '0', then exit from the sideband initialization state 702 is made through the transition 716 to the mainband initialization state 606. In some implementations, transition 716 is identical transition 720. In other implementations, transition 716 may be provided to initialize link state and status information when provision is made to abandon return to the prior state after sideband link retraining.

FIG. 7 provides an example based on detection of a sideband error event in the active state 704. However, the concepts disclosed herein apply equally when a sideband error event is detected in other states. The value of Err 752 in the sideband error register 740 can be set in any of the states 606, 608, 610, 612, 614, 616, 704, and an exit from the sideband initialization state 702 can return to the state 606, 608, 610, 612, 614, 616 or 704 in which the sideband error event was detected. In the example of a sideband error event detected in the low-power state 612, a transition to the sideband initialization state 702 may be indicated if an L1 power-down mode is in effect.

Figure 8:
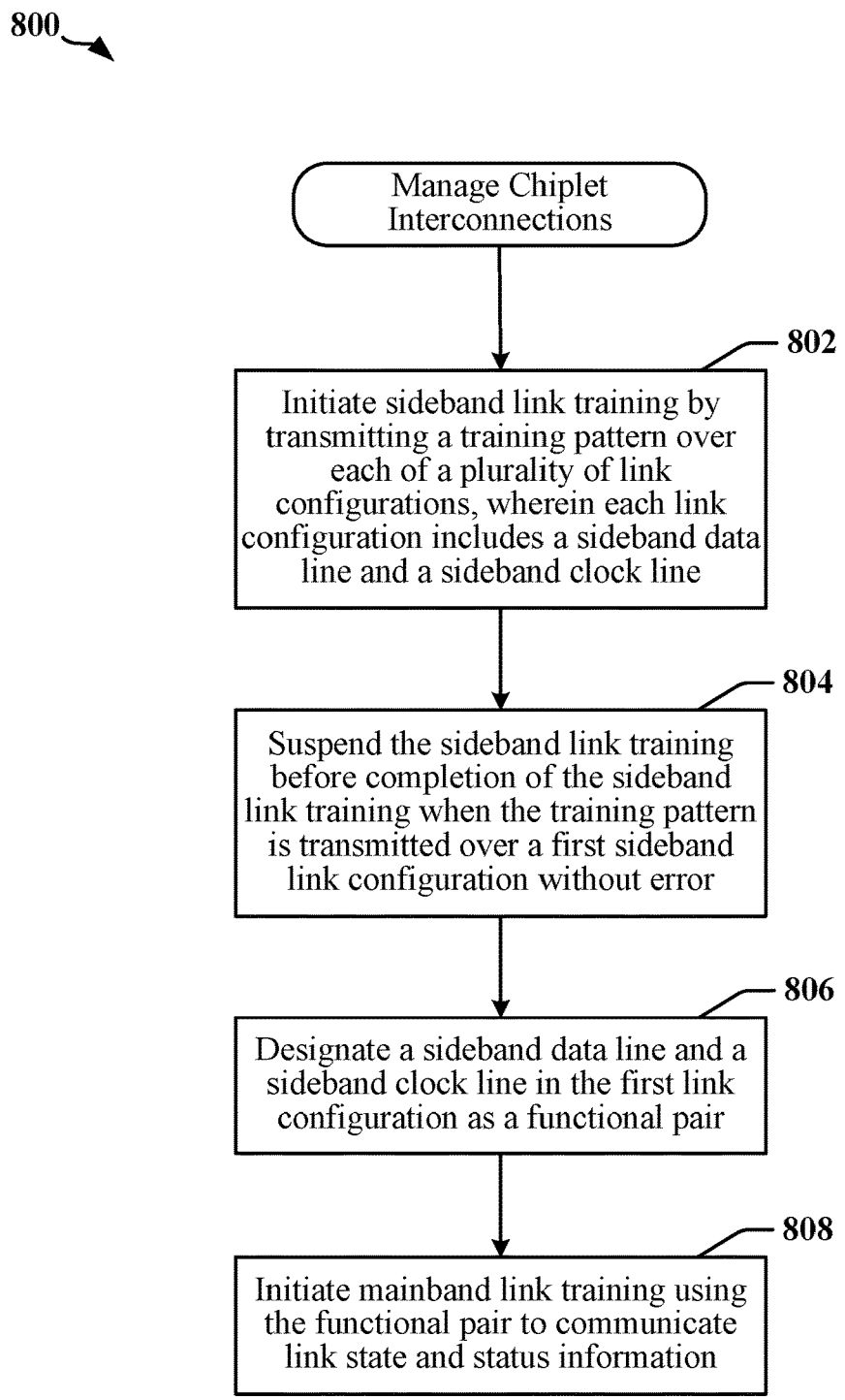
FIG. 8 is a flowchart of a method for managing an interconnection between chiplets in accordance with certain aspects of this disclosure.

FIG. 8 is a flowchart 800 of a method for managing an interconnection between chiplets in accordance with certain aspects of this disclosure. In some instances, the method is implemented using a processor, a controller, a finite state machine or some combination of processors, controllers and finite state machines.

At block 802 in the illustrated method, sideband link training may be initiated. Sideband training may include transmitting a training pattern over each of a plurality of link configurations. Each link configuration includes a sideband data line and a sideband clock line. At block 804 in the illustrated method, the sideband link training is suspended before completion of the sideband link training when the training pattern is transmitted over a first sideband link configuration without error. Suspending the sideband link training may include terminating the sideband link training. At block 806 in the illustrated method, a sideband data line and a sideband clock line in the first sideband link configuration are designated as a functional pair. At block 808 in the illustrated method, mainband link training may be initiated using the functional pair to communicate link state and status information.

In certain implementations, sideband link retraining may be initiated when a sideband error is detected. The sideband link retraining may include transmitting the training pattern over the functional pair. The sideband link retraining may be terminated when the training pattern is transmitted over the functional pair without error. The sideband link retraining may be continued using other link configurations in the plurality of link configurations when a sideband link error is detected while transmitting the training pattern over the functional pair. The interconnection may be reset when sideband link errors are detected in all transmissions during the sideband link retraining.

In one example, the sideband error is detected in a transmission over the sideband link when the interconnection is in an active state in which the mainband link is configured for exchanging mainband data. In this example, the interconnection may be returned to the active state after terminating the sideband link retraining. In another example, the sideband error is detected in a transmission over the sideband link when the interconnection is in a low-power state. In this example, the interconnection may be returned to the low-power state after terminating the sideband link retraining. In another example, the sideband error is detected in a transmission over the sideband link when the interconnection is in a mainband initialization state or a mainband training state. In this example, the interconnection may be returned to the mainband initialization state or the mainband training state after terminating the sideband link retraining.

In certain implementations, the sideband link training is defined by a UCIe standard. In some implementations, each link configuration includes one of two sideband data lines and one of two sideband clock lines.

In certain implementations, the sideband link training and/or the sideband link retraining is managed or controlled by FSMs in the chiplets. Each FSM may be configured to operate as an LTSSM in accordance with UCIe specifications.

The method illustrated in FIG. 8 may be executed in or using an IC device. The IC device may include multiple semiconductor dice mounted on a substrate. The IC device may be implemented using chiplets. In certain applications, at least one semiconductor die may be stacked on at least one other semiconductor die within an IC package. Each semiconductor die includes at least one circuit block configured to implement a function of the IC device.

The IC device may include a transmitter physical layer circuit coupled to a plurality of sideband data lines and a plurality of sideband clock lines, a transmitter physical layer circuit coupled to the plurality of sideband data lines and the plurality of sideband clock lines, and a controller. The controller may be configured to initiate sideband link training that includes transmitting a training pattern over each of a plurality of link configurations.

Each link configuration includes a sideband data line and a sideband clock line. The controller may be further configured to suspend the sideband link training before completion of the sideband link training when the training pattern is transmitted over a first sideband link configuration without error, designate a sideband data line and a sideband clock line in the first sideband link configuration as a functional pair, and initiate mainband link training using the functional pair to communicate link state and status information.

The controller may be further configured to initiate sideband link retraining when a sideband error is detected. The sideband link retraining may include transmitting the training pattern over the functional pair. The controller may be further configured to terminate the sideband link retraining when the training pattern is transmitted over the functional pair without error. The controller may be further configured to continue the sideband link retraining using other link configurations in the plurality of link configurations when a sideband link error is detected while transmitting the training pattern over the functional pair. The controller may be further configured to reset an interconnection between the chiplets when sideband link errors are detected in all transmissions during the sideband link retraining.

In one example, the sideband error is detected in a transmission over the sideband link when the interconnection is in an active state in which the mainband link is configured for exchanging mainband data. In this example, the interconnection may be returned to the active state after terminating the sideband link retraining. In another example, the sideband error is detected in a transmission over the sideband link when the interconnection is in a low-power state. In this example, the interconnection may be returned to the low-power state after terminating the sideband link retraining. In another example, the sideband error is detected in a transmission over the sideband link when the interconnection is in a mainband initialization state or a mainband training state. In this example, the interconnection may be returned to the mainband initialization state or the mainband training state after terminating the sideband link retraining.

In certain implementations, the sideband link training is defined by a UCIe standard. In some implementations, each link configuration includes one of two sideband data lines and one of two sideband clock lines.

In certain implementations, the sideband link training and/or the sideband link retraining is managed or controlled by FSMs in the chiplets. Each FSM may be configured to operate as an LTSSM in accordance with UCIe specifications.

In various aspects of the disclosure, a processor-readable storage medium that stores code that, when executed by a processor causes a processing circuit to initiate sideband link training that includes transmitting a training pattern over each of a plurality of link configurations. Each link configuration includes a sideband data line and a sideband clock line. The code further causes the processing circuit to suspend the sideband link training before completion of the sideband link training when the training pattern is transmitted over a first sideband link configuration without error, designate a sideband data line and a sideband clock line in the first sideband link configuration as a functional pair, and initiate mainband link training using the functional pair to communicate link state and status information.

In certain implementations, the code further causes the processing circuit to initiate sideband link retraining when a sideband error is detected. The sideband link retraining includes transmitting the training pattern over the functional pair. The code may further cause the processing circuit to terminate the sideband link retraining when the training pattern is transmitted over the functional pair without error. The code may further cause the processing circuit to continue the sideband link retraining using other link configurations in the plurality of link configurations when a sideband link error is detected while transmitting the training pattern over the functional pair. The code may further cause the processing circuit to reset the interconnection when sideband link errors are detected in all transmissions during the sideband link retraining.

Some implementation examples are described in the following numbered clauses:

1. A method for managing an interconnection between chiplets, comprising: initiating sideband link training that includes transmitting a training pattern over each of a plurality of link configurations, wherein each link configuration includes a sideband data line and a sideband clock line; suspending the sideband link training before completion of the sideband link training when the training pattern is transmitted over a first sideband link configuration without error; designating a sideband data line and a sideband clock line in the first sideband link configuration as a functional pair; and initiating mainband link training using the functional pair to communicate link state and status information.
2. The method as described in clause 1, further comprising: initiating sideband link retraining when a sideband error is detected, wherein the sideband link retraining includes transmitting the training pattern over the functional pair.
3. The method as described in clause 2, further comprising: terminating the sideband link retraining when the training pattern is transmitted over the functional pair without error; and continuing the sideband link retraining using other link configurations in the plurality of link configurations when a sideband link error is detected while transmitting the training pattern over the functional pair.
4. The method as described in clause 3, further comprising: resetting the interconnection when sideband link errors are detected in all transmissions during the sideband link retraining.
5. The method as described in any of clauses 2-4, further comprising: detecting the sideband error in a transmission over the sideband link when the interconnection is in an active state in which the mainband link is configured for exchanging mainband data; and returning the interconnection to the active state after terminating the sideband link retraining.
6. The method as described in any of clauses 2-4, further comprising: detecting the sideband error in a transmission over the sideband link when the interconnection is in a low-power state; and returning the interconnection to the low-power state after terminating the sideband link retraining.
7. The method as described in any of clauses 2-4, further comprising: detecting the sideband error in a transmission over the sideband link when the interconnection is in a mainband initialization state or a mainband training state; and returning the interconnection to the mainband initialization state or the mainband training state after terminating the sideband link retraining.
8. The method as described in any of clauses 1-7, wherein the sideband link training is defined by a Universal Chiplet Interconnect Express (UCIe) standard.
9. The method as described in any of clauses 1-8, wherein each link configuration includes one of two sideband data lines and one of two sideband clock lines.
10. The method as described in any of clauses 1-9, wherein the method is managed or controlled by finite state machines in the chiplets, each finite state machine being configured to operate as a link training and status state machine (LTSSM) in accordance with UCIe specifications.
11. A processor-readable storage medium storing code thereon, the code when executed by a processor causes a processing circuit to: initiate sideband link training that includes transmitting a training pattern over each of a plurality of link configurations, wherein each link configuration includes a sideband data line and a sideband clock line; suspend the sideband link training before completion of the sideband link training when the training pattern is transmitted over a first sideband link configuration without error; designate a sideband data line and a sideband clock line in the first sideband link configuration as a functional pair; and initiate mainband link training using the functional pair to communicate link state and status information.
12. The processor-readable storage medium as described in clause 11, wherein the code further causes the processing circuit to: initiate sideband link retraining when a sideband error is detected, wherein the sideband link retraining includes transmitting the training pattern over the functional pair.

13. The processor-readable storage medium as described in clause 12, wherein the code further causes the processing circuit to: terminate the sideband link retraining when the training pattern is transmitted over the functional pair without error; and continue the sideband link retraining using other link configurations in the plurality of link configurations when a sideband link error is detected while transmitting the training pattern over the functional pair.

14. The processor-readable storage medium as described in clause 13, wherein the code further causes the processing circuit to: reset an interconnection between chiplets when sideband link errors are detected in all transmissions during the sideband link retraining.

15. The processor-readable storage medium as described in any of clauses 12-14, wherein the code further causes the processing circuit to: detect the sideband error in a transmission over the sideband link when an interconnection between chiplets is in an active state in which the mainband link is configured for exchanging mainband data; and return the interconnection to the active state after terminating the sideband link retraining.

16. The processor-readable storage medium as described in any of clauses 12-14, wherein the code further causes the processing circuit to: detect the sideband error in a transmission over the sideband link when an interconnection between chiplets is in a low-power state; and return the interconnection to the low-power state after terminating the sideband link retraining.

17. The processor-readable storage medium as described in any of clauses 12-14, wherein the code further causes the processing circuit to: detect the sideband error in a transmission over the sideband link when an interconnection between chiplets is in a mainband initialization state or a mainband training state; and return the interconnection to the mainband initialization state or the mainband training state after terminating the sideband link retraining.

18. The processor-readable storage medium as described in any of clauses 11-17, wherein the sideband link training is defined by a Universal Chiplet Interconnect Express (UCIe) standard.

19. The processor-readable storage medium as described in any of clauses 11-18, wherein each link configuration includes one of two sideband data lines and one of two sideband clock lines.

20. The processor-readable storage medium as described in any of clauses 11-19, wherein the sideband link training and the sideband link retraining is managed or controlled by finite state machines in chiplets, each finite state machine being configured to operate as a link training and status state machine (LTSSM) in accordance with UCIe specifications.

21. A sideband communication system, comprising: a transmitter physical layer circuit coupled to a plurality of sideband data lines and a plurality of sideband clock lines; a transmitter physical layer circuit coupled to the plurality of sideband data lines and the plurality of sideband clock lines; and a controller configured to: initiate sideband link training that includes transmitting a training pattern over each of a plurality of link configurations, wherein each link configuration includes a sideband data line and a sideband clock line; suspend the sideband link training before completion of the sideband link training when the training pattern is transmitted over a first sideband link configuration without error; designate a sideband data line and a sideband clock line in the first sideband link configuration as a functional pair; and initiate mainband link training using the functional pair to communicate link state and status information.

22. The sideband communication system as described in clause 21, wherein the controller is further configured to: initiate sideband link retraining when a sideband error is detected, wherein the sideband link retraining includes transmitting the training pattern over the functional pair.

23. The sideband communication system as described in clause 22, wherein the controller is further configured to: terminate the sideband link retraining when the training pattern is transmitted over the functional pair without error; and continue the sideband link retraining using other link configurations in the plurality of link configurations when a sideband link error is detected while transmitting the training pattern over the functional pair.

24. The sideband communication system as described in clause 23, wherein the controller is further configured to: reset an interconnection between chiplets when sideband link errors are detected in all transmissions during the sideband link retraining.

25. The sideband communication system as described in any of clauses 22-24, wherein the controller is further configured to: detect the sideband error in a transmission over the sideband link when an interconnection between chiplets is in an active state in which the mainband link is configured for exchanging mainband data; and return the interconnection to the active state after terminating the sideband link retraining.

26. The sideband communication system as described in any of clauses 22-24, wherein the controller is further configured to: detect the sideband error in a transmission over the sideband link when an interconnection between chiplets is in a low-power state; and return the interconnection to the low-power state after terminating the sideband link retraining.

27. The sideband communication system as described in any of clauses 22-24, wherein the controller is further configured to: detect the sideband error in a transmission over the sideband link when an interconnection between chiplets is in a mainband initialization state or a mainband training state; and return the interconnection to the mainband initialization state or the mainband training state after terminating the sideband link retraining.

28. The sideband communication system as described in any of clauses 21-27, wherein the sideband link training is defined by a Universal Chiplet Interconnect Express (UCIe) standard.

29. The sideband communication system as described in any of clauses 21-28, wherein each link configuration includes one of two sideband data lines and one of two sideband clock lines.

30. The sideband communication system as described in any of clauses 21-29, wherein the sideband link training and the sideband link retraining is managed or controlled by finite state machines in chiplets, each finite state machine being configured to operate as a link training and status state machine (LTSSM) in accordance with UCIe specifications.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for managing an interconnection between chiplets, comprising:
    initiating sideband link training that includes transmitting a training pattern over each of a plurality of link configurations, wherein each link configuration includes a sideband data line and a sideband clock line;
    suspending the sideband link training before completion of the sideband link training when the training pattern is transmitted over a first sideband link configuration without error;
    designating a sideband data line and a sideband clock line in the first sideband link configuration as a functional pair;
    initiating mainband link training using the functional pair to communicate link state and status information;
    initiating sideband link retraining when a sideband error is detected, wherein the sideband link retraining includes transmitting the training pattern over the functional pair;
    terminating the sideband link retraining when the training pattern is transmitted over the functional pair without error; and
    continuing the sideband link retraining using other link configurations in the plurality of link configurations when a sideband link error is detected while transmitting the training pattern over the functional pair.

2. The method of claim 1, further comprising:
    resetting the interconnection when sideband link errors are detected in all transmissions during the sideband link retraining.

3. The method of claim 1, further comprising:
    detecting the sideband error in a transmission over the sideband link when the interconnection is in an active state in which the mainband link is configured for exchanging mainband data; and
    returning the interconnection to the active state after terminating the sideband link retraining.

4. The method of claim 1, further comprising:
    detecting the sideband error in a transmission over the sideband link when the interconnection is in a low-power state; and
    returning the interconnection to the low-power state after terminating the sideband link retraining.

5. The method of claim 1, further comprising:
    detecting the sideband error in a transmission over the sideband link when the interconnection is in a mainband initialization state or a mainband training state; and
    returning the interconnection to the mainband initialization state or the mainband training state after terminating the sideband link retraining.

6. The method of claim 1, wherein each link configuration includes one of two sideband data lines and one of two sideband clock lines, and wherein the method is managed or controlled by finite state machines in the chiplets, each finite state machine being configured to operate as a link training and status state machine (LTSSM) in accordance with UCIe specifications.

7. A non-transitory computer-readable-readable storage medium storing code thereon, the code when executed by a processor causes a processing circuit to:
    initiate sideband link training that includes transmitting a training pattern over each of a plurality of link configurations, wherein each link configuration includes a sideband data line and a sideband clock line;
    suspend the sideband link training before completion of the sideband link training when the training pattern is transmitted over a first sideband link configuration without error;
    designate a sideband data line and a sideband clock line in the first sideband link configuration as a functional pair;
    initiate mainband link training using the functional pair to communicate link state and status information;
    initiate sideband link retraining when a sideband error is detected, wherein the sideband link retraining includes transmitting the training pattern over the functional pair;
    detect the sideband error in a transmission over the sideband link when an interconnection between chiplets is in an active state in which the mainband link is configured for exchanging mainband data; and
    return the interconnection to the active state after terminating the sideband link retraining.

8. The non-transitory computer-readable-readable storage medium of claim 7, wherein the code further causes the processing circuit to:
    terminate the sideband link retraining when the training pattern is transmitted over the functional pair without error; and
    continue the sideband link retraining using other link configurations in the plurality of link configurations when a sideband link error is detected while transmitting the training pattern over the functional pair.

9. The non-transitory computer-readable storage medium of claim 7, wherein the code further causes the processing circuit to: detect the sideband error in a transmission over the sideband link when an interconnection between chiplets is in a low-power state; and return the interconnection to the low-power state after terminating the sideband link retraining.

10. The non-transitory computer-readable-readable storage medium of claim 7, wherein each link configuration includes one of two sideband data lines and one of two sideband clock lines, and wherein the sideband link training and the sideband link retraining is managed or controlled by finite state machines in chiplets, each finite state machine being configured to operate as a link training and status state machine (LTSSM) in accordance with UCIe specifications.

11. A sideband communication system, comprising:
a transmitter physical layer circuit coupled to a plurality of sideband data lines and a plurality of sideband clock lines;
a controller configured to:
initiate sideband link training that includes transmitting a training pattern over each of a plurality of link configurations, wherein each link configuration includes a sideband data line and a sideband clock line;
suspend the sideband link training before completion of the sideband link training when the training pattern is transmitted over a first sideband link configuration without error;
designate a sideband data line and a sideband clock line in the first sideband link configuration as a functional pair;
initiate mainband link training using the functional pair to communicate link state and status information;
initiate sideband link retraining when a sideband error is detected, wherein the sideband link retraining includes transmitting the training pattern over the functional pair;
detect the sideband error in a transmission over the sideband link when an interconnection between chiplets is in a low-power state; and
return the interconnection to the low-power state after terminating the sideband link retraining.

12. The sideband communication system of claim 11, wherein the controller is further configured to:
terminate the sideband link retraining when the training pattern is transmitted over the functional pair without error; and
continue the sideband link retraining using other link configurations in the plurality of link configurations when a sideband link error is detected while transmitting the training pattern over the functional pair.

13. The sideband communication system of claim 11, wherein the controller is further configured to:
detect the sideband error in a transmission over the sideband link when an interconnection between chiplets is in an active state in which the mainband link is configured for exchanging mainband data; and
return the interconnection to the active state after terminating the sideband link retraining.

14. The sideband communication system of claim 11, wherein each link configuration includes one of two sideband data lines and one of two sideband clock lines, and wherein the sideband link training and the sideband link retraining is managed or controlled by finite state machines in chiplets, each finite state machine being configured to operate as a link training and status state machine (LTSSM) in accordance with UCIe specifications.

\* \* \* \* \*